United States Patent
Rouis

(10) Patent No.: US 8,401,770 B2
(45) Date of Patent: Mar. 19, 2013

(54) METHOD AND DEVICE FOR CONTROLLING START TIME OF VEHICLE HEAT ENGINE

(75) Inventor: Oussama Rouis, Levallois Perret (FR)

(73) Assignee: Valeo Equipements Electriques Moteur, Creteil Cedex (FR)

( * ) Notice: Subject to any disclaimer, the term of this patent is extended or adjusted under 35 U.S.C. 154(b) by 441 days.

(21) Appl. No.: 12/468,234

(22) Filed: May 19, 2009

(65) Prior Publication Data

US 2009/0295319 A1    Dec. 3, 2009

(30) Foreign Application Priority Data

May 27, 2008   (FR) ..................................... 08 53425

(51) Int. Cl.
G06F 19/00   (2011.01)
G06G 7/70   (2006.01)

(52) U.S. Cl. .................. 701/113; 318/400.13; 318/716; 318/811; 318/430; 318/431; 180/65.285; 180/65.245; 290/36 R

(58) Field of Classification Search ................ 290/36 R; 318/400.13, 716, 811; 701/113; 180/65.285
See application file for complete search history.

(56) References Cited

U.S. PATENT DOCUMENTS

| | | | |
|---|---|---|---|
| 6,335,609 B1 * | 1/2002 | Amey et al. ................... | 318/811 |
| 6,380,701 B1 * | 4/2002 | Kahlon et al. ................ | 318/139 |
| 7,205,731 B2 * | 4/2007 | Nagayama .................... | 318/139 |
| 2005/0093494 A1 * | 5/2005 | Nagayama .................... | 318/139 |
| 2005/0104544 A1 * | 5/2005 | Ishikawa ....................... | 318/139 |
| 2006/0017290 A1 * | 1/2006 | Murty et al. ................ | 290/36 R |
| 2006/0038530 A1 * | 2/2006 | Holling ......................... | 318/807 |
| 2007/0240662 A1 * | 10/2007 | Kitamura et al. ........... | 123/179.4 |
| 2007/0278966 A1 * | 12/2007 | Chemin et al. ............. | 315/209 R |
| 2009/0295319 A1 * | 12/2009 | Rouis ....................... | 318/400.13 |

FOREIGN PATENT DOCUMENTS

| | | |
|---|---|---|
| DE | 103 59 486 A1 | 7/2005 |
| DE | 10 2006 057 892 A1 | 6/2008 |
| EP | 1 469 587 A1 | 10/2004 |

OTHER PUBLICATIONS

Ahner (EP 1469587, IDS) English translation, 10. 2004.*
"Induction and Synchronous Motor Fundamentals", PDHengineer.com, Course No. E-1005, 2002.*

* cited by examiner

Primary Examiner — John K Kim
(74) Attorney, Agent, or Firm — Berenato & White, LLC

(57) ABSTRACT

A method to permit a start time of a heat engine of a vehicle to be controlled. The heat engine is mechanically coupled to a polyphase rotary electrical machine connected to an on-board electrical network. The method is of the type consisting of carrying out pre-fluxing by establishing an excitation current in the inductor for a predetermined pre-fluxing time (Tpref) before the phase currents are established. In accordance with the method, the predetermined pre-fluxing time (Tpref) is a function of the voltage (Vbat+X) of the on-board electrical network. Typically, the predetermined pre-fluxing time (Tpref) is increased when the voltage (Vbat+X) of the on-board electrical network reduces within a nominal voltage range (V 1, V2).

11 Claims, 4 Drawing Sheets

METHOD AND DEVICE FOR CONTROLLING START TIME OF VEHICLE HEAT ENGINE

This application claims foreign priority benefit under 35 U.S.C. §119 of French patent application no. 08/53425, filed on May 27, 2008, which application is incorporated herein by reference.

BACKGROUND OF THE INVENTION

1. Field of the Invention

The present invention relates to a method and a device for controlling the start time of a vehicle heat engine.

The invention also relates to a starter-alternator which can carry out the method and comprises said device.

2. Description of Related Art

Energy saving and pollution reduction considerations, particularly in urban surroundings, have prompted automotive vehicle manufacturers to equip their models with an automatic heat engine stop/restart system such as the system known as the "Stop and Go" system.

As discussed in VALEO EQUIPEMENTS ELECTRIQUES MOTEUR's French patent document FR 2 875 549, vehicles are rendered capable of functioning in "Stop and Go" mode by dint of a reversible electrical machine, or starter-alternator, coupled to a heat engine supplied by an AC/DC converter in "starter" mode.

Under certain conditions, using a starter-alternator in the "Stop and Go" functional mode consists of causing the heat engine to stop completely when the vehicle itself is stopped, then restarting the heat engine subsequent, for example, to an action by the driver which is interpreted as a restart command.

A typical "Stop and Go" situation is that of stopping at a red light. When the vehicle stops at the light, the heat engine is automatically stopped, then when the light turns green, the engine is restarted using the starter-alternator following detection by the system of the clutch pedal being depressed by the driver, or of any other action which is interpreted as meaning that the driver intends to restart the vehicle.

Clearly, the automatic restart function carried out by a starter-alternator system is a function which must be as transparent as possible for the driver of the vehicle.

In starter-alternators constituted by a polyphase rotary electrical machine, the phase currents and the excitation current are generally supplied simultaneously by the power circuits at the instant of restarting.

US. Pat. No. 6,335,609 states that under such circumstances, the engine torque can only be produced with a perceptible delay.

That delay is due to a magnetic flux being established in the rotor, and it proposes pre-fluxing the inductor before the phase currents are established, in order to reduce the time necessary for the heat engine to attain a predetermined rotation speed.

However, the method is carried out by controlling the excitation current for a fixed period, and it does not appear to be adapted to starter-alternators which are supplied by an on-board variable voltage electrical network of the "14+X" type.

As a result, there is a need for a method and a device which can keep the start time within limits which are acceptable to the driver in the case of an automatic stop/restart system architecture of the micro-hybrid type, where the voltage of the on-board electrical is network depends on the charge state of the ultracapacitor.

SUMMARY OF THE INVENTION

The present invention aims to satisfy this need and more precisely, it provides a method for controlling the start time for a heat engine of a vehicle, which is mechanically coupled to a polyphase rotary electrical machine connected to an on-board electrical network.

The method is of the type consisting of pre-fluxing by establishing an excitation current in the inductor for a predetermined pre-fluxing time before the phase currents are established.

According to the invention, the predetermined pre-fluxing time is, in remarkable manner, a function of a variable voltage (termed 14+X volt) of the on-board electrical network.

Highly advantageously, said predetermined pre-fluxing time is increased when the voltage of the on-board electrical network drops within a nominal voltage range.

In accordance with a further characteristic of the method of the invention, the predetermined pre-fluxing time is in the range from a minimum value below which the start time is greater than a reference threshold, to a maximum value corresponding to magnetic saturation of the inductor.

Preferably, the predetermined pre-fluxing time is tabulated for the reference threshold of the start time as a function of the on-board electrical network voltage during a prior step by means of a two-dimensional linear interpolation of the variations in the start time as a function of the pre-fluxing time and a discrete set of values for this voltage.

The on-board electrical network is advantageously connected to the terminals of at least one ultracapacitor or the like and for this reason, in accordance with the method of the invention, in remarkable manner, the predetermined pre-fluxing time is also a function of the voltage at the terminals of said ultracapacitor.

The invention also concerns a device for controlling the start time of a heat engine of a vehicle adapted to carrying out the method described above.

In a manner which is known per se, said heat engine is mechanically coupled to a polyphase rotary electrical machine supplied by power circuits connected to an on-board electrical network and controlled by a control circuit.

The device of the invention is remarkable in that it comprises means for determining a pre-fluxing time as a function of a voltage of the on-board electrical network.

Preferably, said means are included in the control circuit and comprise a memory containing a tabulation of the pre-fluxing time as a function of the voltage of the on-board electrical network for a reference threshold of the start time.

The on-board electrical network is advantageously connected to the terminals of at least one ultracapacitor or the like.

A starter-alternator for a heat engine of a vehicle having a regenerative braking function of the micro-hybrid type also highly advantageously includes the control device of the invention described above.

These few essential specifications will make apparent to the skilled person the advantages of the invention over the prior art.

The detailed specifications of the invention are given in the description below which is made with reference to the accompanying drawings. It should be noted that these drawings are solely for the purposes of illustrating the text of the description and do not in any way constitute a limitation upon the scope of the invention.

DETAILED DESCRIPTION OF THE PREFERRED EMBODIMENT

Figure 1:
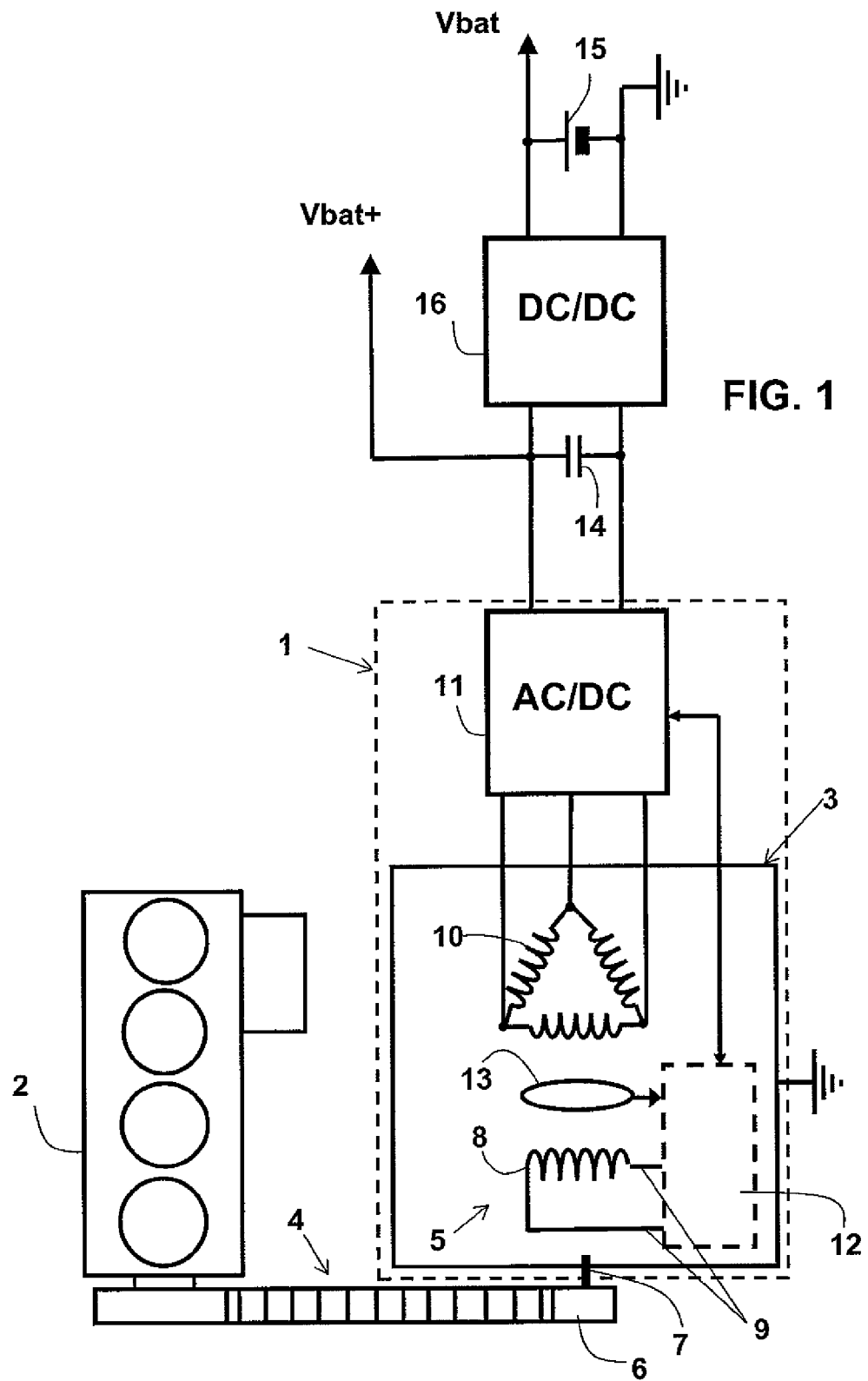
FIG. 1 is a diagrammatic representation of an automatic micro-hybrid type stop/restart system using a start time control device in accordance with the invention.

The preferred embodiment of the invention concerns vehicles equipped with a starter-alternator with a regenerative braking device of the micro-hybrid type as shown diagrammatically in FIG. 1.

FIG. I shows a starter-alternator 1 coupled to a vehicle heat engine 2.

Said starter-alternator 1 comprises a reversible excitation type polyphase electrical machine 3 coupled to the engine 2 by means of a belt-and-pulley transmission 4.

The electrical machine 3 comprises a rotor 5 which is fixed to an output pulley 6 at the end of a shaft 7. The rotor 5 has an inductor 8 supplied via a rotary commutator by an excitation circuit 9.

The machine 3 also includes phase windings 10, or inductors, supplied via an AC/DC converter 11.

A control circuit 12 controls the power circuits of the machine 3, constituted by the AC/DC converter 11 and the excitation circuit 9, depending on information supplied by a position sensor 13 for the rotor 5 and on control signals generated by an electronic control unit for the vehicle.

The electronic control unit receives the operating parameters for the engine 2 and other relevant information via dedicated wired connections or via an onboard CAN type data bus.

The AC/DC converter 11 is preferably constituted by a chopper circuit for the on-board electrical network voltage Vbat+X generating pulses the frequency and width of which are controlled by the control circuit 12 when the starter-alternator 1 functions in electric motor mode, This chopper circuit 12 is a reversible AC/DC converter which functions in synchronous rectifier mode when the starter-alternator 1 functions in alternator mode.

In the micro-hybrid type architecture shown in FIG. 1, an on-board electrical network is connected to the terminals of an ultracapacitor 14 instead of being supplied directly by an on-board battery 15, as is the case for a conventional architecture.

When functioning in generator mode, the electrical machine 3 charges the ultracapacitor 14 via the reversible AC/DC converter 11 functioning in rectifier mode and supplies the on-board electrical network with a voltage Vbat+X which is higher than the voltage Vbat in the battery.

The on-board electrical network including a DC/DC converter 16 allows electrical energy to be exchanged between the on-board battery 15 and the ultracapacitor 14.

It is proposed, in accordance with a general principle of the invention, in the context of a system carrying out automatic restart functions, to maintain the start time of the heat engine 2 constant regardless of the voltage Vbat+X of the on-board electrical network.

Figure 2:
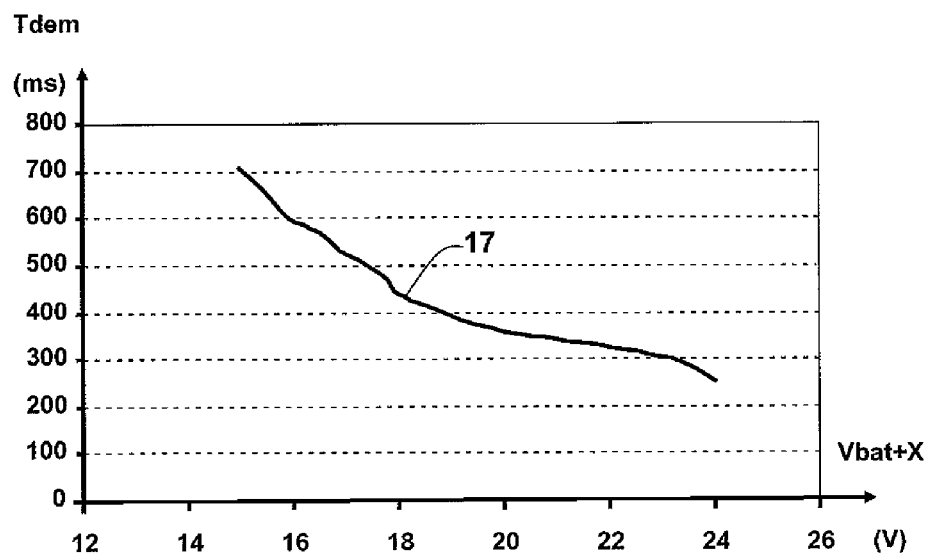
FIG. 2 shows the start-up time of a heat engine in an automatic stop/restart system analogous to that shown in FIG. 1, as a function of the voltage of the on-board electrical network, in the absence of the device of the invention.

As can be seen in FIG. 2, in the absence of appropriate corrective measures, the start time Tdem of the heat engine 2 depends on the voltage Vbat+X of the on-board electrical network, i.e. the charge state of the ultracapacitor 14.

The measurements 17 were taken over a fixed pre-fluxing time corresponding to magnetic saturation of the inductor 8, and for a constant angle profile.

When the charge on the ultracapacitor 14 is low, then under these conditions the start time Tdem, defined as the time interval between the time when the electrical machine 3 applies a torque to the heat engine 2 and the time when it reaches a reference rotation speed, may reach unacceptable values having regard to the desired aim of transparency of the system.

Thus, a weighting function is proposed which adjusts the start parameters to ensure a mean start time Tdem for a whole range of nominal operational voltages.

In the case of an EDLC (electrochemical double layer capacitor) type ultracapacitor 14 comprising, for example, 10 elementary 1500 F cells mounted in series and thus having a resultant capacity of 150 F, and a working voltage of 25 V, the nominal operational range is assumed to be in the range 18 to 24 V.

Figure 3:
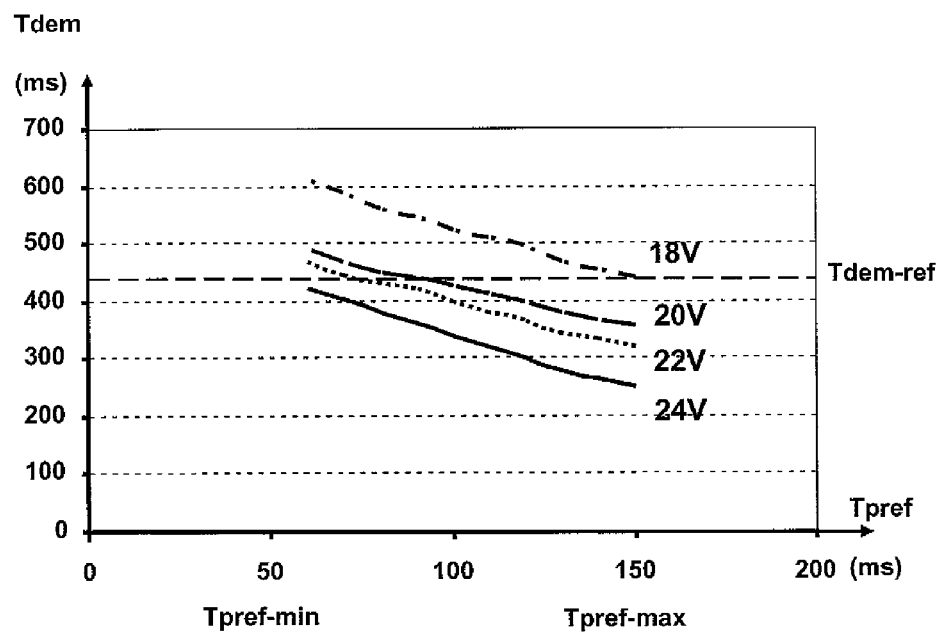
FIG. 3 shows the variations in the start time as a function of the pre-fluxing time and of a discrete set of voltages for the on-board electrical network in an automatic stop/restart system analogous to that shown in FIG. 1, in the absence of the device of the invention.

FIG. 3 shows the results of tests carried out on a micro-hybrid system analogous to that shown in FIG. 1 without a start time control device, varying the pre-fluxing time Tpref and for a plurality of voltages (18 V, 20 V, 22 V and 24 V) for the on-board electrical network Vbat+X.

The pre-fluxing time Tpref varies between a minimum value Tpref-min below which the start time is always above a reference threshold Tdem-ref, i.e. below which the start-up function is degraded even at maximum charge of the ultracapacitor 14, and a maximum value Tpref-max above which magnetic saturation of the inductor 8 is observed.

If this reference threshold Tdem-ref is selected to be the start time Tdem which is to be kept constant, then a two-dimensional linear interpolation can be employed to calculate the pre-fluxing time Tpref corresponding to each value for the voltage of the on-board electrical network Vbat+X included in the nominal voltage range.

Figure 4:
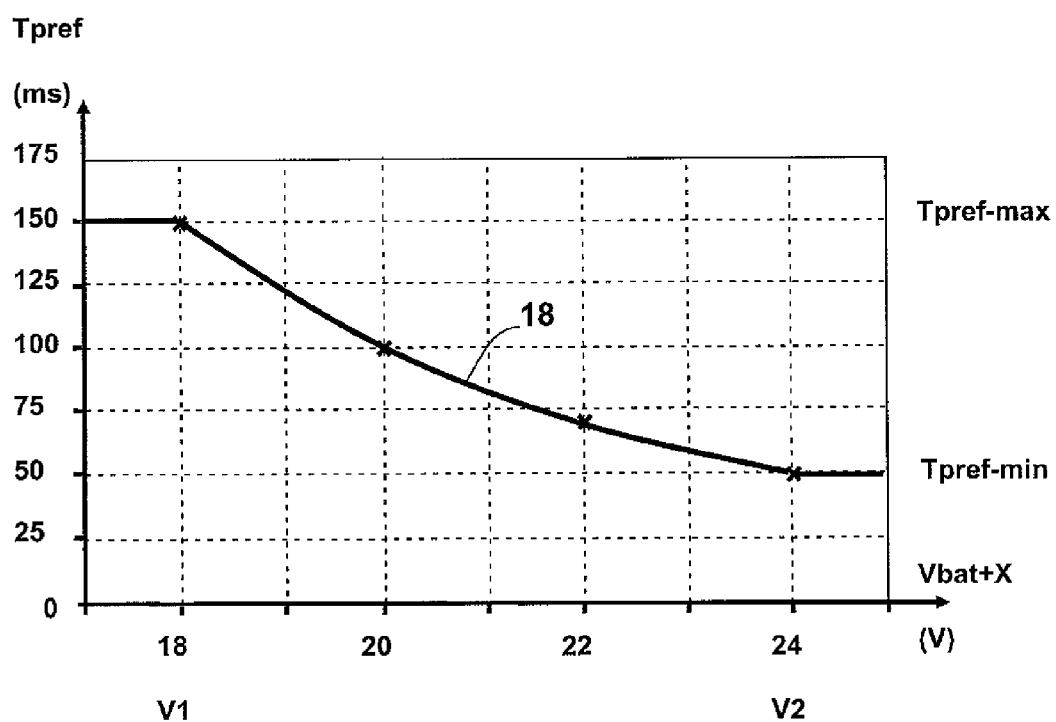
FIG. 4 shows the variations in the pre-fluxing time as a function of the voltage of the on-board electrical network in accordance with the method of the invention.

FIG. 4 shows the interpolated values 18 for the pre-fluxing time Tpref which can retain a constant start time Tdem equal to Tdem-ref for any value of the voltage Vbat+X of the on-board electrical network included between the minimum voltage V1 (minimum charge of ultracapacitor 14) and the maximum voltage V2 (maximum charge of the ultracapacitor 14).

The consequences of carrying out the method for controlling the start time Tdem of the invention in the automatic micro-hybrid type stop/restart system shown in FIG. 1 are shown to good effect in timing diagrams 19, 20 of figures Sa and 5b which indicate the rotation speed N of the starter-alternator 1 as a function of time during the start-up phase. It will be noted in this example that the rotation speed N of the starter-alternator 1 is linked to that Nm of the heat engine 2 by a ratio of approximately 2.4, corresponding to a "starter-alternator/heat engine shaft" pulley ratio for the mechanical transmission.

Figure 5A:
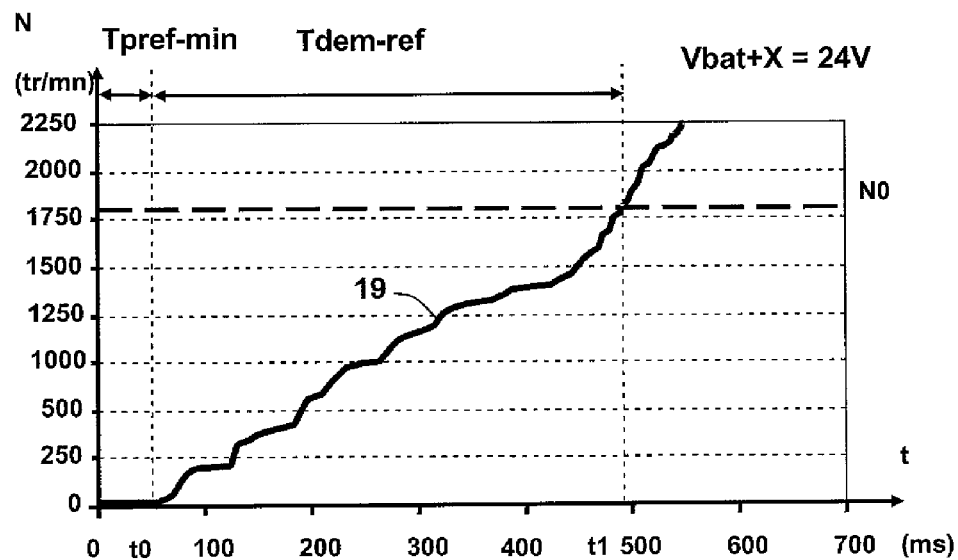
FIGS. 5a and 5b show a constant start time under application of the method of the invention for two different voltages for the on-board electrical network.

Since the heat engine 2 is stopped, the excitation current is supplied to the rotor 5 from the initial restart command time. The phase currents are only supplied to the stator by the converter 11 at a time to following a delay equal to the minimum value Tpref-min for the pre-fluxing time Tpref in the case in which the voltage of the on-board electrical network Vbat+X is the maximum voltage V2 (FIG. 5a).

The rotation speed N increases from time t0 to reach a reference rotation speed N0 at time t1, i.e. by definition after a delay t1-t0 equal to the reference start time Tdem-ref.

Figure 5B:
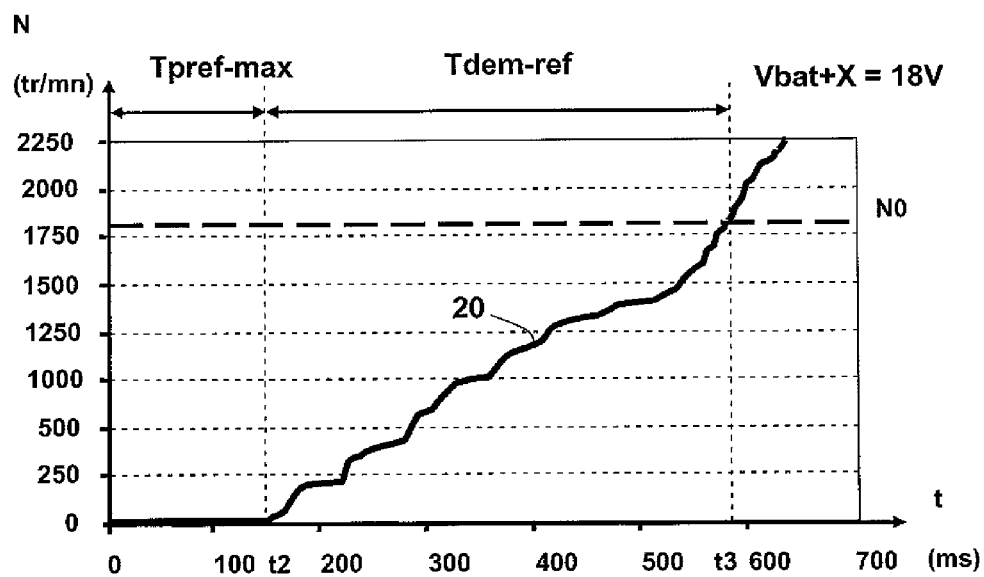

In the case in which the on-board electrical network voltage Vbat+X is the minimum voltage V1 (FIG. 5b), the phase currents are only provided by the AC/DC converter 11 at a time t2 after a delay equal to the maximum value, Tpref-max, for the pre-fluxing time Tpref.

The rotation speed N reaches the reference rotation speed N0 at a time t3 after the same interval, Tdem-ref, as in the preceding case.

The analogous timing diagrams show that the interval between the time at which the phase currents are provided and the time at which the reference rotation speed N0 is reached is constant when the voltage of the on-board electrical network Vbat+X varies across the whole range of nominal voltages V1, V2 provided that the pre-fluxing time Tpref follows the variation law shown in FIG. 4.

This law is tabulated in a memory of the control device 12 of the starter-alternator 1, which determines the appropriate pre-fluxing time Tpref depending on the supply voltage Vbat+X which is applied to it.

Clearly, the invention is not limited to the single preferred embodiment described above.

The measurements and test results are given purely by way of example for a type 144/5 starter-alternator (stator diameter: 144 mm; number of coils: 5) and a 150F/25V EDLC ultracapacitor.

The minimum value, Tpref-min, of the pre-fluxing time, Tpref, and the maximum value, Tpref-max, which are suitable for this model are respectively approximately 50 ms and 150 ms when the voltage of the on-board electrical network Vbat+X varies between 18V and 24V; the reference threshold Tdem-ref of the start time Tdem which is retained, which allows the starter-alternator 1 to reach a reference rotation speed N0 of approximately 1800 rpm, is approximately 440 ms. This reference rotation speed N0 of approximately 1800 rpm corresponds to a reference rotation speed Nm0 of the heat engine 2 of approximately 750 rpm (idling speed of the heat engine).

The above description is applicable to other starter-alternator models 1 or to other types of energy stores, for example a Ni-MH battery replacing the ultracapacitor 14, simply by employing numerical values for the parameters which differ from those indicated.

Thus, the invention encompasses any possible variation in embodiment which falls within the scope defined by the accompanying claims.

The invention claimed is:

1. A method for controlling a start time (Tdem) of a heat engine (2) of a vehicle, said engine (2) being mechanically coupled to a polyphase rotary electrical machine (3) connected to an on-board electrical network, said start time (Tdem) being a time interval during which said engine (2) reaches a reference rotation speed from a stop, said rotary electrical machine comprising a rotor with an inductor (8), and phase windings;

said method comprising the step of carrying out pre-fluxing by establishing an excitation current in said inductor (8) for a predetermined pre-fluxing time (Tpref) before phase currents in said phase windings are established;

said predetermined pre-fluxing time (Tpref) being a function of a variable voltage (Vbat+X) of said on-board electrical network when said variable voltage (Vbat+X) is within a nominal voltage range (V1, V2) so as to retain said start time constant for any value of said variable voltage (Vbat+X) being within said nominal voltage range (V1, V2);

said predetermined pre-fluxing time (Tpref) is increased when said voltage (Vbat+X) is decreased while remaining within said nominal voltage range (V1, V2);

said predetermined pre-fluxing time (Tpref) is decreased when said voltage (Vbat+X) is increased while remaining within said nominal voltage range (V1, V2);

said variable voltage (Vbat+X) being higher than a voltage Vbat of an on-board battery of said vehicle.

2. The method according to claim 1, wherein said predetermined pre-fluxing time (Tpref) is in the range from a minimum value (Tpref-min) below which said start time (Tdem) is above a reference threshold (Tdem-ref) and a maximum value (Tpref-max) corresponding to magnetic saturation of said inductor (8).

3. The method according to claim 2, wherein said predetermined pre-fluxing time (Tpref) is tabulated for said reference threshold (Tdem-ref) of said start time (Tdem) as a function of said voltage (Vbat+X) during a previous step by means of a two-dimensional linear interpolation of the variations in said start time (Tdem) as a function of said pre-fluxing time (Tpref) and a discrete set of values for said voltage (Vbat+X).

4. The method according to claim 1, wherein said on-board electrical network is connected to terminals of at least one ultracapacitor.

5. A device for controlling the start time (Tdem) of a heat engine (2) of a vehicle adapted to carry out the method according to claim 1, said engine (2) being mechanically coupled to an induction type polyphase rotary electrical machine (3) supplied by power circuits (9, 11) connected to an on-board electrical network and controlled by a control circuit (12), comprising means for determining a pre-fluxing time (Tpref) as a function of a voltage of said on-board electrical network (Vbat+X).

6. A device for controlling the start time (Tdem) of a heat engine (2) of a vehicle according to claim 5, wherein said means are included in said control circuit (12) and comprise a memory containing a tabulation of said pre-fluxing time (Tpref) as a function of said voltage (Vbat+X) for a reference threshold of said start time (Tdem-ref).

7. A device for controlling the start time (Tdem) of a heat engine (2) of a vehicle according to claim 6, wherein said on-board electrical network is connected to the terminals of at least one ultracapacitor (14) or the like.

8. A device for controlling the start time (Tdem) of a heat engine (2) of a vehicle according to claim 7, wherein said pre-fluxing time (Tpref) varies between 50 ms (Tpref-min) and 150 ms (Tpref-max) when said voltage (Vbat+X) varies between 18 V (V1) and 24 V (V2), said reference threshold (Tdem-ref) being approximately 440 ms.

9. A starter-alternator (1) for a heat engine (2) of a vehicle having a micro-hybrid type regenerative braking function, comprimising the control device according to claim 5.

10. A method for controlling a start time (Tdem) of a heat engine of a vehicle, said engine being mechanically coupled to a polyphase rotary electrical machine connected to an on-board electrical network through a capacitor, said on-board electrical network providing exchange of electrical energy between an on-board battery of said vehicle and said capacitor, said on-board electrical network supplied with a variable voltage (Vbat+X) higher than a voltage Vbat of said on-board battery, said start time (Tdem) being a time interval during which said engine (2) reaches a reference rotation speed from a stop, said rotary electrical machine comprising a rotor with an inductor, and phase windings;

said method comprising the step of carrying out pre-fluxing by establishing an excitation current in said inductor for a predetermined pre-fluxing time (Tpref) before phase currents in said phase windings are established;

said predetermined pre-fluxing time (Tpref) being a function of a variable voltage (Vbat+X) of said on-board electrical network when said variable voltage (Vbat+X) is within a nominal voltage range (V1, V2) so as to retain said start time constant for any value of said variable voltage (Vbat+X) being within said nominal voltage range (V1, V2);

said predetermined pre-fluxing time (Tpref) is increased when said voltage (Vbat+X) is decreased while remaining within said nominal voltage range (V1, V2);

said predetermined pre-fluxing time (Tpref) is decreased when said voltage (Vbat+X) is increased while remaining within said nominal voltage range (V1, V2).

11. The method according to claim 10, wherein said capacitor is an ultracapacitor chargeable by said rotary electrical machine via a reversible AC/DC converter.

* * * * *